United States Patent Office
3,546,245
Patented Dec. 8, 1970

3,546,245
2-(1-LOWER-ALKYL-3-PYRROLIDINYL)-1,3-PROPANEDIOL DICARBAMATES
Grover Cleveland Helsley, Richmond, Va., assignor to A. H. Robins Company, Incorporated, Richmond, Va., a corporation of Virginia
No Drawing. Filed Aug. 2, 1968, Ser. No. 749,604
Int. Cl. C07d 27/04
U.S. Cl. 260—326.3                 9 Claims

ABSTRACT OF THE DISCLOSURE 2-(1-lower alkyl-3-pyrrolidinyl)-1,3-propanediol dicarbamates having tranquilizing activity are disclosed. The compounds are produced by (1) reaction of 1-lower alkyl-3-chloropyrrolidines with diethyl malonate, (2) metal hydride reduction of the diethyl 2-(1-lower alkyl-3-pyrrolidinyl)-malonates and (3) reaction of the 2-(1-lower alkyl-3-pyrrolidinyl)-1,3-propanediols with isocyanates.

---

The present invention relates to novel carbamates and more particularly to 2-(1-lower-alkyl-3-pyrrolidinyl)-2-substituted-1,3-propanediol dicarbamates, compositions containing the same and to processes for making them.

The invention is especially concerned with compounds of the formula:

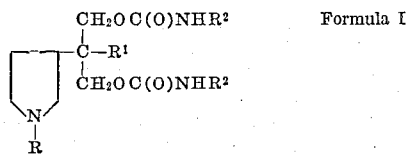

Formula I wherein:

R is lower-alkyl, $R^1$ is selected from the group consisting of hydrogen, lower-alkyl and aryl, and $R^2$ is selected from the group consisting of lower-alkyl and aryl, and Acid addition salts thereof.

Compounds which block aggressive behavior in fighting mice may be classified as major tranquilizers [Da Vanzo, J. P. et al., Psychopharmacologia 9, 210 (1966)]. The novel compounds of Formula I are effective in blocking aggressive behavior in fighting mice and accordingly can be classified as major tranquilizers.

The object of this invention is to provide new and valuable 2-(1-lower-alkyl-3-pyrrolidinyl) - 2 - substituted-1,3-propanediol dicarbamates, compositions containing the same as active ingredients, and processes for their production.

Other objects of the present invention will be apparent to one skilled in the art and from the following description and the appended claims.

In the foregoing Formula I and where they appear elsewhere throughout this specification, the terms have the following significance.

The term "lower alkyl" as used herein includes straight and branched chain radicals of up to eight carbon atoms inclusive and is exemplified by such groups as methyl, ethyl, propyl, isopropyl, butyl, tertiary butyl, amyl, hexyl, isoamyl, heptyl, octyl and the like.

The term "lower alkoxy" has the formula —O-lower-alkyl.

By an "aryl" radical is meant a phenyl radical or a phenyl radical substituted by any radical or radicals which are not reactive or otherwise interfering under the conditions of reaction, such radicals including the trifluoromethyl, lower-alkoxy, lower-alkyl and halogen radicals. The substituted phenyl radicals have preferably no more than three substituents such as those given above and, furthermore, these substituents can be in various available positions of the phenyl nucleus and, where more than one substituent is present, can be the same or different and can be in various position combinations relative to each other. The lower-alkyl and lower-alkoxy substituents each have preferably from one to four carbon atoms which can be arranged as straight or branched chains. A total of nine carbon atoms in all ring substituents is the preferred maximum.

The term "carbamate" encompasses not only the primary amino containing carbamate radicals, but also the corresponding N-aryl and N-(lower-alkyl)-carbamyl radicals.

This invention also includes acid addition salts of the bases of Formula I with organic and inorganic acids. Such salts are easily prepared by methods known in the art. When the compounds are to be used as intermediates for preparing other compounds or for any non-pharmaceutical use, the toxicity or non-toxicity of the salt is immaterial; when the compounds are to be used as pharmaceuticals, they are most conveniently used in the form of non-toxic acid addition salts. Both toxic and non-toxic salts are therefore within the purview of the invention. The acids which can be used to prepare the preferred non-toxic acid addition salts are those which produce, when combined with the free bases, salts whose anions are relatively innocuous in therapeutic doses of the salts, so that beneficial physiological properties inherent in the free bases are not vitiated by side effects ascribable to the anions.

The base is reacted with the calculated amount of organic or inorganic acid in a solvent miscible with water, such as ethanol or isopropanol, with isolation of the salt by concentration and cooling, or the base is reacted with an excess of the acid in a solvent immiscible with water, such as ethyl ether or isopropyl ether, with the desired salt separating directly. Exemplary of such organic salts are those formed with citric, acetic, lactic, maleic, fumaric, benzoic, tartaric, ascorbic, pamoic, succinic, methanesulfonic, malic, citraconic, itaconic acid and the like. Exemplary of such inorganic salts are those formed with hydrochloric, hydrobromic, sulfuric, phosphoric and nitric acids.

The following chart illustrates the process of the invention and shows the procedures involved both in preparing the intermediates and the final products of the invention. In Chart I, all the symbols have the values previously assigned.

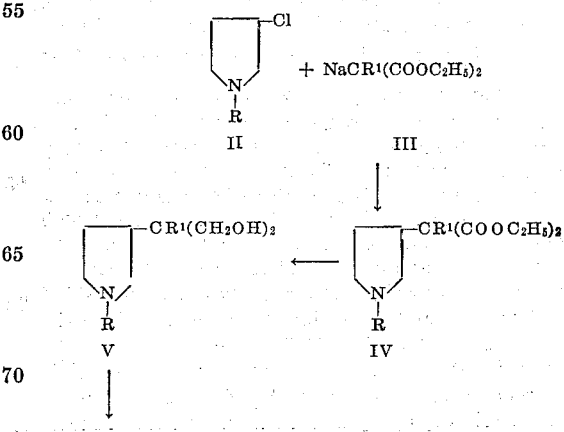

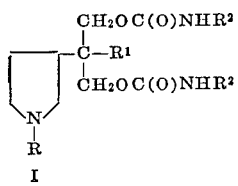

I

The starting materials of the present invention are 2-(1 - lower - alkyl - 3 - pyrrolidinyl)-2-substituted-1,3-propanediols of Formula V. These compounds may be obtained by the process described hereinbelow.

As illustrated in Chart I, a 2-substituted-diethyl malonate -(III) as its sodium salt is reacted with a 3-chloro-1-lower - alkyl - pyrrolidine (II) to give a diethyl 2-(1-lower - alkyl - 3 - pyrrolidinyl)-2-substituted malonate (IV) which is reduced by a metal hydride to a 2-(1-lower-alkyl - 3 - pyrrolidinyl) - 2-substituted-1,3-propanediol (V).

As a general procedure for preparing the starting materials (V), a sodium ethoxide solution is prepared in the usual manner, cooled to a suitable temperature, generally less than about 50° C., and a slight excess of a diethyl 2 - substituted - malonate is slowly added dropwise to the stirred reaction medium. The clear solution is heated to reflux temperature and an equimolar amount of 3 - chloro - 1 - lower-alkyl-pyrrolidine is added slowly. Stirring and refluxing of the reaction mixture in a nitrogen atmosphere is continued for an additional period, generally from about sixty to about ninety hours. The ethanol is distilled from the reaction flask, the residual oil is cooled and treated with ice water. The product is extracted into an organic solvent as, for example, ether, and dried with a suitable drying agent such as magnesium sulfate.

The filtered product may be further purified, preferably by distillation under reduced pressure to yield a diethyl-2-(1 - lower - alkyl - 3-pyrrolidinyl)-2-substituted malonate.

In an alternative method, sodio diethyl malonate is reacted with 3 - chloro - 1 - lower-alkyl-pyrrolidine in dimethyl sulfoxide. Equimolar amounts of the reactants are combined in dimethyl sulfoxide at a temperature of from 80° C. to about 100° C. and stirred in a nitrogen atmosphere with subsequent heating at temperatures ranging from about 110° C. to about 125° C. The reaction is usually completed after about twelve to about twenty hours. The reaction mixture is treated with an excess of ice water, and the product is extracted with a water-immiscible solvent such as ether. The extracts are dried with a suitable drying agent such as magnesium sulfate, filtered, and further purified, preferably by distillation under reduced pressure to yield a product corresponding to Formula IV.

The diethyl - 2 - (1 - lower-alkyl-3-pyrrolidinyl)-2-substituted malonates of Formula IV are reduced to the corresponding propanediols by a metal hydride, preferably lithium aluminum hydride. Thus to a stirred suspension of lithium aluminum hydride in dry ether is added a solution of a compound of Formula IV in a dry solvent such as ether. Gentle refluxing is usually maintained during the addition and continued from about one to about two hours. After cooling the reaction mixture, water is added slowly. The precipitated alumina is dissolved by the addition of an excess of 20% to 25% sodium hydroxide. The product is isolated by extraction with a water immiscible solvent such as ether and the combined extracts are dried with a suitable drying agent such as magnesium sulfate.

The product may be further purified, preferably by distillation in vacuo to produce compounds corresponding to Formula V.

PREPARATION 1

Diethyl-2-(1-ethyl-3-pyrrolidinyl)-malonate

In a three-liter, three-necked flask fitted with stirrer, condenser and dropping funnel were placed 1,000 ml. of absolute ethanol and 46 g. (2 atoms) of sodium. The sodium ethoxide solution was stirred and cooled to about 50° C. and 336 g. (2.1 mole) of diethyl malonate was added slowly to the reaction flask. The clear solution was heated to reflux and 268 g. (2.0 mole) of 3-chloro-1-ethylpyrrolidine was added slowly. The mixture was stirred and refluxed in an atmosphere of nitrogen for 88 hours. The ethanol was distilled from the recation flask and the residue was cooled and treated with 500 ml. of ice water. The mixture was extracted with ether and the ether extracts were washed with water and then dried over magnesium sulfate. The ether was evaporated and the residual oil was distilled at reduced pressure. The fraction boiling at 90–93° C./.02 mm. weighed 175 g. (34% yield). The product was redistilled and the fraction boiling at 90–91° C./.02 mm. was collected. The water-white non-viscous oil weighed 160 g. $n^{24}$ 1.4502.

*Analysis.*—Calculated for $C_{13}H_{23}NO_4$ (percent): C, 60.68; H, 9.01; N, 5.44. Found (percent): C, 60.82; H, 8.88; N, 5.58.

PREPARATION 2

Diethyl-2-(1-ethyl-3-pyrrolidinyl)-2-methylmalonate

Approximately 200 ml. of absolute ethanol and 5.8 g. (0.25 atom) of sodium were combined in a suitable reaction flask. The sodium ethoxide solution was stirred and cooled to about 50° C. and 43.5 g. (0.25 mole) of diethyl methylmalonate was added slowly to the reaction flask. The clear solution was heated to reflux and 33.6 g. (0.25 mole) of 3 - chloro - 1 - ethyl-pyrrolidine was added slowly. The mixture was stirred and heated at reflux temperature in an atmosphere of nitrogen for 64 hours. After the ethanol was distilled from the reaction flask, the residue was cooled and treated with 200 ml. of ice water. The mixture was extracted with ether and the combined extracts were washed with water and dried over magnesium sulfate. The ether was evaporated and the residual oil distilled at reduced pressure. The fraction boiling at 85–87° C./.03 mm. weighed 16.5 g. (24% yield). Redistillation of the product yielded a water-white, non-viscous oil boiling at 91–92° C./.06 mm. and weighing 11.2 g. $n^{22}$ 1.4532.

*Analysis.*—Calculated for $C_{14}H_{25}NO_4$ (percent): C, 61.96; H, 9.29; N, 5.16. Found (percent): C, 62.01; H, 9.16; N, 5.21.

PREPARATION 3

Diethyl-2-(1-ethyl-3-pyrrolidinyl)-2-ethylmalonate

To a rapidly stirred solution of 421 g. (2.0 mole) of the sodium salt of diethyl ethylmalonate in 1500 ml. of dimethylsulfoxide at 90° C. was added rapidly 268 g. (2.0 mole) of 3-chloro-1-ethylpyrrolidine. The mixture was heated with stirring for 16 hours at 112–115° C. under an atomsphere of nitrogen. The contents of the flask were cooled and treated with 1500 ml. of water. The emulsion was extracted with ether and the combined extracts were washed with water and dried over magnesium sulfate. After the solvent was evaporated, the residual oil was distilled rapidly at reduced pressure. The fraction boiling at 98–102° C./0.15 mm. weighed 240 g. (42% yield). The light yellow, non-viscous oil was redistilled slowly and the fraction boiling at 88–89° C./.05 mm. weighed 198 g. $n^{24}$ 1.4553.

*Analysis.*—Calculated for $C_{15}H_{27}NO_4$ (percent): C, 63.13; H, 9.54; N, 4.91. Found (percent): C, 63.39; H, 9.46; N, 5.17.

PREPARATION 4

Diethyl-2-(1-ethyl-3-pyrrolidinyl)-2-phenylmalonate

To a rapidly stirred solution of 130 g. (0.50 mole) of the sodium salt of diethylphenylmalonate in 400 ml. of dimethyl sulfoxide at 90° C. was added 67 g. (0.50 mole) of 3-chloro-1-ethylpyrrolidine. The mixture was heated with stirring for 16 hours at 112–115° C. under an atmosphere of nitrogen. After cooling, the contents of the flask were treated with 800 ml. of water. The emulsion was extracted with ether and the combined extracts were washed and dried over magnesium sulfate. After the ether was evaporated, the residual oil was distilled at reduced pressure; the fraction boiling at 138–145° C./.05 mm. weighed 22.1 g. (13% yield). Redistillation of the product yielded a pale yellow, nonviscous oil boiling at 135–136° C./.03 mm. and weighing 12.1 g. $n^{22}$ 1.5070.

Analysis.—Calculated for $C_{19}H_{27}NO_4$ (percent): C, 68.44; H, 8.16; N, 4.20. Found (percent): C, 68.57; H, 8.02; N, 4.25.

PREPARATION 5

Diethyl-2-(1-methyl-3-pyrrolidinyl)-2-propylmalonate

Using the method of Preparation 3, the sodium salt of diethyl propylmalonate is reacted with 3-chloro-1-methylpyrrolidine to produce diethyl-2-(1-methyl-3-pyrrolidinyl)-2-propylmalonate.

PREPARATION 6

Diethyl-2-(1-propyl-3-pyrrolidinyl)-2-butylmalonate

Using the method of Preparation 3, the sodium salt of diethyl butylmalonate is reacted with 3-chloro-1-propylpyrrolidine top roduce diethyl-2-(1-propyl - 3 - pyrrolidinyl)-2-butylmalonate.

PREPARATION 7

2-(1-ethyl-3-pyrrolidinyl)-1,3-propanediol

To a stirred suspension of 15.2 g. (0.40 mole) of lithium aluminum hydride in 300 ml. of dry ether was added slowly a solution of 51.5 g. (0.20 mole) of ethyl 2-(1-ethyl-3-pyrrolidinyl)malonate in 100 ml. of dry ether. Gentle refluxing was maintained during the addition. After the addition was complete, stirring and refluxing were continued for one hour. The suspension was cooled and 25 ml. of water was added slowly to the reaction flask. The precipitated alumina was dissolved by the addition of 300 ml. of 25% sodium hydroxide and the basic solution was extracted several times with ether. The combined extracts were dried over magnesium sulfate and the solvent was evaporated. The residual oil was distilled at reduced pressure and the fraction boiling at 106–108° C./.05 mm. was collected. The water-white viscous oil weighed 18.5 g. (53% yield). The product was redistilled and the fraction boiling at 107–108° C./.05 mm. weighed 14.5 g.

Analysis.—Calculated for $C_9H_{19}NO_2$ (percent): C, 62.34; H, 11.05; N, 8.09. Found (percent): C, 62.21; H, 11.09; N, 8.13.

PREPARATION 8

2-(1-ethyl-3-pyrrolidinyl)-2-ethyl-1,3-propanediol

To a suspension of 30.4 g. (0.80 mole) of lithium aluminum hydride and 600 ml. of dry ether, under an atmosphere of nitrogen, was added a solution of 114 g. (0.40 mole) of diethyl 2-(1-ethyl-3-pyrrolidinyl)-2-ethylmalonate in 400 ml. of ether; gentle refluxing was maintained during the addition. After the addition was completed, stirring and refluxing were continued for one hour. The suspension was cooled and 50 ml. of water was added slowly to the reaction flask. The precipitated alumina was dissolved by the addition of 800 ml. of 20% sodium hydroxide and the basic solution was extracted with ether. After the combined extracts were dried over magnesium sulfate, the solvent was evaporated. The residual oil was distilled at reduced pressure and the fraction boiling at 113–115° C./.04 mm. was collected. The water-white viscous oil weighed 64 g. (79% yield). Redistillation yielded 58 g. of product boiling at 114–115° C./.04 mm. $n^{23}$ 1.4935.

Analysis.—Calculated for $C_{11}H_{23}NO_2$ (percent): C, 65.63; H, 11.52; N, 6.96. Found (percent): C, 65.30; H, 11.66; N, 6.93.

PREPARATION 9

2-(1-methyl-3-pyrrolidinyl)-2-methyl-1,3-propanediol

Using the method of Preparation 8, diethyl-2-(1-methyl-3-pyrrolidinyl)-2-methylmalonate is reduced with lithium aluminum hydride to produce 2-(1-methyl - 3 - pyrrolidinyl)-2-methyl-1,3-propanediol.

PREPARATION 10

2-(1-butyl-3-pyrrolidinyl)-2-phenyl-1,3-propanediol

Using the method of Preparation 8, diethyl-2-(1-butyl-3-pyrrolidinyl)-2-phenylmalonate is reduced with lithium aluminum hydride to produce 2-(1-butyl-3-pyrrolidinyl)-2-phenyl-1,3-propanediol.

PREPARATION 11

2-(1-methyl-3-pyrrolidinyl)-2-propyl-1,3-propanediol

Using the method of Preparation 8, diethyl-2-(1-methyl-3-pyrrolidinyl)-2-propylmalonate is reduced with lithium aluminum hydride to produce 2-(1-methyl-3-pyrrolidinyl)-2-propyl-1,3-propanediol.

PREPARATION 12

2-(1-propyl-3-pyrrolidinyl)-2-butyl-1,3-propanediol

Using the method of Preparation 8, diethyl-2-(1-propyl-3-pyrrolidinyl)-2-butylmalonate is reduced with lithium aluminum hydride to produce 2-(1-propyl-3-pyrrolidinyl)-2-butyl-1,3-propanediol.

As shown in Chart I, the novel compounds of the invention embraced by Formula I are prepared by reacting a 2-(1-lower-alkyl-3-pyrrolidinyl)-2-substituted - 1,3-propanediol (V) with isocyanates.

As a general procedure for preparing the novel compounds, a stirred solution of a 2-(1-lower-alkyl-3-pyrrolidinyl)-2-substituted-1,3-propanediol in an appropriate solvent, such as benzene, is treated dropwise with a benzene solution of the isocyanate at or near room temperature.

The reaction mixture is usually stirred at room temperature for a period of from about one hour to about twenty hours followed by a short period of refluxing as, for example, from about thirty minutes to about three hours. The solvent is evaporated in vacuo and the product is isolated and purified by crystallization or by conversion to an acid addition salt.

The following examples are given by way of illustration only and are not to be construed as limiting.

EXAMPLE 1

2-(1-ethyl-3-pyrrolidinyl)-1,3-propanediol bis(N-methylcarbamate)

To a stirred solution of 5.2 g. (0.03 mole) of 2-(1-ethyl-3-pyrrolidinyl)-1,3-propanediol in 40 ml. of dry benzene protected from atmospheric moisture at 25° C. was added slowly 3.4 g. (0.06 mole) of methyl isocyanate in 40 ml. of dry benzene. The mixture was stirred two hours at 25° C. and then refluxed for one hour. A white crystalline product separated when the mixture was cooled; 50 ml. of isooctane was added. The solid was separated by filtration and recrystallized from an isopropyl ether-isooctane mixture. The dry compound weighed 6.0 g. (70% yield) and melted at 193–105° C. when heated slowly. When the product was heated rapidly it melted at 90–92° C. and upon cooling the compound which crystallized melted at 104–105° C. Thin layer chromatography and infrared spectroscopy indicated the product was pure.

Analysis.—Calculated for $C_{13}H_{25}N_3O_4$ (percent): C, 54.33; H, 8.77; N, 14.62. Found (percent): C, 54.23; H, 8.80; N, 14.71.

EXAMPLE 2

2-(1-ethyl-3-pyrrolidinyl)-1,3-propanediol bis(N-phenyl-carbamate) hydrochloride To a stirred solution of 5.2 g. (0.03 mole) of 2-(1-ethyl-3-pyrrolidinyl)-1,3-propanediol in 60 ml. of dry benzene at 25° C. was added slowly 7.1 g. (0.06 mole) of phenyl isocyanate in 50 ml. of dry benzene. The mixture was stirred 16 hours at room temperature and then refluxed for two hours. The solvent was evaporated and the residue was dissolved in 50 ml. of isopropanol. The solution was treated with 100 ml. of 1 N hydrochloric acid. The white crystalline hydrochloride which formed on standing was separated by filtration and washed with cold water. The dried compound weighed 8.8 g. (66% yield) and melted with decomposition at 215–216° C. A portion of the product which was recrystallized from a water-isopropanol mixture melted at 213–215° C.

*Analysis.*—Calculated for $C_{23}H_{30}N_3O_4Cl$ (percent): C, 61.67; H, 6.75; N, 9.38. Found (percent): C, 61.76; H, 6.81; N, 9.40.

EXAMPLE 3

2-(1-ethyl-3-pyrrolidinyl)-1,3-propanediol bis[N-4-methoxyphenyl)carbamate]

To a stirred solution of 6.9 g. (0.04 mole) of 2-(1-ethyl-3-pyrrolidinyl)-1,3-propanediol in 60 ml. of dry benzene at 25° C. was added slowly 11.9 g. (0.08 mole) of p-methoxyphenyl isocyanate in 50 ml. of dry benzene. The mixture was stirred two hours at room temperature and then refluxed for 30 minutes. Isooctane was added to the reaction flask and the white crystalline product which formed on cooling was separated by filtration. The compound was recrystallized from a benzene-isooctane mixture; it melted at 116–118° C. and weighed 11.8 g. (63% yield). The melting point was unchanged after the compound was recrystallized several times from the same solvent system.

*Analysis.*—Calculated for $C_{25}H_{33}N_3O_6$ (percent): C, 63.68; H, 7.05; N, 8.91. Found (percent): C, 63.76; H, 7.14; N, 9.09.

EXAMPLE 4

2-(1-ethyl-3-pyrrolidinyl)-1,3-propanediol bis[N-(4-chlorophenyl)-carbamate]

To a stirred solution of 5.9 g. (0.034 mole) of 2-(1-ethyl-3-pyrrolidinyl)-1,3-propanediol in 50 ml. of dry benzene at 25° C. was added slowly 10.4 g. (0.068 mole) of 4-chlorophenyl isocyanate in 50 ml. of dry benzene. A white precipitate began to form before the entire amount of isocyanate had been added. The mixture was stirred at room temperature and then refluxed for 30 minutes. Isooctane was added to the reaction flask and the crystalline product was separated by filtration. The compound was recrystallized several times from benzene; it weighed 10.1 g. (61% yield) and melted at 130.5–131.5° C.

*Analysis.*—Calculated for $C_{23}H_{27}Cl_2N_3O_4$ (percent): C, 57.50; H, 5.67; N, 8.75. Found (percent): C, 57.43; H, 5.71; N, 8.86.

EXAMPLE 5

2-(1-ethyl-3-pyrrolidinyl)-2-ethyl-1,3-propanediol bis(N-methylcarbamate) hydrochloride To a stirred solution of 10.1 g. (0.05 mole) of 2-(1-ethyl-3-pyrrolidinyl)-2-ethyl-1,3-propanediol in 30 ml. of dry benzene at 25° C. was added slowly 5.7 g. (0.10 mole) of methyl isocyanate in 30 ml. of dry benzene. The mixture was stirred 16 hours at room temperature and finally refluxed for two hours. After the solvent was evaporated at reduced pressure, the residual oil was dissolved in isopropanol and treated with ethereal hydrogen chloride. The crystalline product which formed when ethyl acetate was added to the flask was separated by filtration. The white hydrochloride salt weighed 12.2 g. (73% yield) and melted at 137–140° C. The compound was recrystallized from an ethyl acetate-isopropanol mixture and melted at 142–143° C.

*Analysis.*—Calculated for $C_{15}H_{30}ClN_3O_4$ (percent): C, 51.20; H, 8.59; N, 11.94. Found (percent): C, 51.19; H, 8.66; N, 12.11.

EXAMPLE 6

2-(1-ethyl-3-pyrrolidinyl)-2-ethyl-1,3-propanediol bis(N-phenylcarbamate) hydrochloride To a stirred solution of 6.0 g. (0.03 mole) of 2-(1-ethyl-3-pyrrolidinyl)-2-ethyl-1,3-propanediol in 30 ml. of dry benzene at 25° C. was added slowly 7.2 g. (0.06 mole) of phenyl isocyanate in 25 ml. of dry benzene. The mixture was stirred 16 hours at room temperature and then the solvent was evaporated. The residual oil was dissolved in an ether-isopropanol mixture and treated with ethereal hydrogen chloride. The crystalline product which formed on standing was recrystallized several times from an isopropanol-isopropyl ether mixture; it melted at 177–178° C. and weighed 10.7 g. (75% yield).

*Analysis.*—Calculated for $C_{25}H_{34}ClN_3O_4$ (percent): C, 63.08; H, 7.20; N, 8.83. Found (percent): C, 63.28; H, 7.43; N, 8.71.

EXAMPLE 7

2-(1-ethyl-3-pyrrolidinyl)-2-ethyl-1,3-propanediol bis[N-(4-methoxyphenyl)-carbamate] hydrochloride To a stirred solution of 6.0 g. (0.03 mole) of 2-(1-ethyl-3-pyrrolidinyl)-2-ethyl-1,3-propanediol in 50 ml. of dry benzene at 20° C. was added slowly 8.9 g. (0.06 mole) of p-methoxyphenyl isocyanate in 40 ml. of dry benzene. The mixture was stirred several hours at room temperature and finally refluxed for one hour. After the solvent was evaporated at reduced pressure, the viscous oil was dissolved in ethyl ether and the resulting clear solution was treated with an ethereal hydrogen chloride solution. After the solid which formed on standing was separated by filtration, it was recrystallized from an isopropyl ether-isopropanol mixture. The white product melted at 152–153.5° C. and weighed 11.4 g. (71% yield). The compound was recrystallized again from the same solvent system and melted at 153–154° C.

*Analysis.*—Calculated for $C_{27}H_{38}ClN_3O_6$ (percent): C, 60.49; H, 7.14; N, 7.84. Found (percent): C, 60.28; H, 7.16; N, 7.70.

EXAMPLE 8

2-(1-ethyl-3-pyrrolidinyl)-2-ethyl-1,3-propanediol bis[N-(3,4,5-trimethoxyphenyl)-carbamate]

To a stirred solution of 6.0 g. (0.03 mole) of 2-(1-ethyl-3-pyrrolidinyl)-2-ethyl-1,3-propanediol in 50 ml. of dry benzene at 25° C. was added slowly 12.6 g. (0.06 mole) of 3,4,5-trimethoxyphenyl isocyanate in 40 ml. of dry benzene. The mixture was stirred several hours at room temperature and finally refluxed for one hour. Thin layer chromatography indicated the reaction was nearly quantitative. After the solvent was evaporated, the glassy residue was triturated with isooctane. The product weighed 12 g. (65% yield). The glass, which did not crystallize and would not form a crystalline salt, was submitted for analysis.

*Analysis.*—Calculated for $C_{31}H_{45}N_3O_{10}$ (percent): C, 60.08; H, 7.32; N, 6.78. Found (percent): C, 59.92; H, 7.35; N, 6.92.

Utilizing the processes of Example 1 through Example 8 above, the following compounds are prepared from the stated starting materials:

2-(1-propyl-3-pyrrolidinyl) - 1,3 - propanediol bis(N-phenylcarbamate) by reacting 2-(1-propyl-3-pyrrolidinyl)-1,3-propanediol and phenyl isocyanate.

2-(1-butyl-3-pyrrolidinyl) - 2 - phenyl-1,3-propanediol bis(N-phenylcarbamate) by reacting 2-(1-butyl-3-pyrrolidinyl)-2-phenyl-1,3-propanediol and phenyl isocyanate.

2-(1-methyl-3-pyrrolidinyl) - 2 - ethyl-1,3-propanediol bis[N-(4-chlorophenyl)-carbamate] by reacting 2-(1-methyl-3-pyrrolidinyl)-2-ethyl-1,3-propanediol and 4-chlorophenyl isocyanate.

2-(1-methyl-3-pyrrolidinyl) - 2 - phenyl-1,3-propanediol bis[N-(4-chlorophenyl)-carbamate] by reacting 2-(1-methyl-3-pyrrolidinyl) - 2 - phenyl - 1,3 - propanediol and 4-chlorophenyl isocyanate.

2-(1-methyl-3-pyrrolidinyl) - 2 - propyl-1,3-propanediol bis[N-(4-methoxyphenyl)-carbamate] by reacting 2-(1-methyl-3-pyrrolidinyl) - 2 - propyl - 1,3 - propanediol and 4-methoxyphenyl isocyanate.

PHARMACOLOGY

The novel compounds described and claimed herein have demonstrated tranquilizing activity when tested in standard laboratory animals using a recognized test method [Da Vanzo, J. P., et al., Psychopharmacologia 9, 210 (1966)]. The $LD_{50}$'s of the compounds in mice have been determined to be in the range of from 400 to about 600 mg./kg. The preferred compounds of the invention were tested at a dose level of 20 mg./kg., i.p., in groups of five mice. The data shown in Table I for the preferred compounds represents the results for groups of five animals tested with each compound. The $ED_{50}$'s were determined by the injection of the appropriate number of doses to mice and subjecting the results to prohibit analysis according to the method of J. T. Litchfield and F. Wilcoxon, J. Pharm. and Exptl. Therap., 96, 99 (1949).

TABLE I.—FIGHTING MICE DATA $$\begin{array}{c} CH_2OC(O)NH_2 \\ | \\ C-R^1 \\ | \\ CH_2OC(O)NHR^2 \end{array}$$

(attached to N-R ring)

| No. | R | $R^1$ | $R^2$ | No. protected/ No. tested (20 mg./kg. IP) | $ED_{50}$, mg./kg. |
|---|---|---|---|---|---|
| 1[1] | $C_2H_5$ | H | $C_6H_5$ | 5/5 | 11(7.3–16.5) |
| 2[2] | $C_2H_5$ | H | p-Cl-$C_6H_4$ | 3/5 | <20 |
| 3 | $C_2H_5$ | $C_2H_5$ | p-$OCH_3C_6H_4$ | 3/5 | 18.2(14.5–22.4) |
| 4 | $C_2H_5$ | $C_2H_5$ | $C_6H_5$ | 4/5 | 17.5(16–19) |

[1] $LD_{50}$=422 mg./kg.
[2] $LD_{50}$=562 mg./kg.

FORMULATION AND ADMINISTRATION

Effective quantities of any of the foregoing pharmacologically active compounds may be administered to a living animal body in capsules, tablets, or elixirs.

Although very small quantities of the active materials of the present invention are effective when minor therapy is involved or in cases of administration to subjects having a relatively low body weight, unit dosages are usually five milligrams or above and preferably twenty-five, fifty or one hundred milligrams or even higher, depending, of course, upon the emergency of the situation and the particular result desired. Five to fifty milligrams appear optimum per unit dose, while usual broader ranges appear to be one to 100 milligrams per unit dose. The active agents of the invention may be combined with other pharmacologically active agents, or with buffers, antacids or the like, for administration and the proportion of the active agent in the compositions may be varied widely. It is only necessary that the active ingredient cnstitute an effective amount, i.e., such that a suitable effective dosage will be obtained consistent with the dosage form employed.

The following formulations are representative for all of the pharmacologically active compounds of the invention.

FORMULATIONS

(1) Capsules

Capsules of 5 mg., 25 mg., and 50 mg. of active ingredient per capsule are prepared; with the higher amounts of active ingredient, reduction may be made in the amount of lactose.

Typical blend for encapsulation:

| | Per capsule, mg. |
|---|---|
| Active ingredient, as salt | 5.0 |
| Lactose | 296.7 |
| Starch | 129.0 |
| Magnesium stearate | 4.3 |
| Total | 435.0 |

Additional capsule formulations preferably contain a higher dosage of active ingredient and are as follows:

| Ingredients | 100 mg. per capsule | 250 mg. per capsule |
|---|---|---|
| Active ingredient, as salt | 100.0 | 250.0 |
| Lactose | 233.5 | 126.5 |
| Starch | 99.2 | 54.2 |
| Magnesium stearate | 4.3 | 4.3 |
| Total, mg. | 435.0 | 435.0 |

In each case, uniformly blend the selected active ingredient with lactose, starch, and magnesium stearate and encapsulate the blend.

(2) Tablets

A typical formulation for a tablet containing 5.0 mg. of active ingredient per tablet follows. The formulation may be used for other strengths of active ingredient by adjustment of weight of dicalcium phosphate.

| | Per tablet, mg. |
|---|---|
| (1) Active ingredient | 5.0 |
| (2) Corn starch | 13.6 |
| (3) Corn starch (paste) | 3.4 |
| (4) Lactose | 79.2 |
| (5) Dicalcium phosphate | 68.0 |
| (6) Calcium stearate | 0.9 |
| Total | 170.1 |

Uniformly blend 1, 2, 4 and 5. Prepare 3 as a 10 percent paste in water. Granulate the blend with starch paste and pass the wet mass through a number eight mesh screen. The wet granulation is dried and passed through a number twelve mesh screen. The dried granules are blended with the calcium stearate and compressed.

Additional tablet formulations preferably contain a higher dosage of the active ingredient and are as follows:

(A) 50 mg. tablet

| Ingredients: | Per tablet, mg. |
|---|---|
| Active ingredient, as salt | 50.0 |
| Lactose | 90.0 |
| Milo starch | 20.0 |
| Corn starch | 38.0 |
| Calcium stearate | 2.0 |
| Total | 200.0 |

Uniformly blend the active ingredient, lactose, milo starch, and corn starch. This blend is granulated using water as a granulating medium. The wet granules are passed through a number eight mesh screen and dried at 140 to 160 degrees Fahrenheit over night. The dried granules are passed through a number ten mesh screen and blended with the proper amount of calcium stearate and this blend is then converted into tablets on a suitable tablet press.

(B) 100 mg. tablets

| Ingredients: | Per tablet, mg. |
| --- | --- |
| Active ingredient, as salt | 100.0 |
| Lactose | 190.0 |
| Dicalcium phosphate | 172.2 |
| Starch | 54.0 |
| Milo starch | 21.6 |
| Calcium stearate | 2.2 |
| Total | 540.0 |

Uniformly blend the active ingredient, lactose, dicalcium phosphate, starch and milo starch. This blend is granulated with water and the wet mass is passed through a number eight mesh screen. The wet granules are dried at 140–160 degrees Fahrenheit over night. The dried granules are passed through a number ten mesh screen. These dried granules are blended with the proper weight of calcium stearate and the lubricated granules are then converted into tablets on a suitable tablet press.

(C) 250 mg. tablets

| Ingredients: | Per tablet, mg. |
| --- | --- |
| Active ingredient, as salt | 250.0 |
| Corn starch | 56.0 |
| Carbowax 6000 (polyethylene glycol of M.W. approximately 6000) | 25.0 |
| Lactose | 35.0 |
| Magnesium stearate | 4.0 |
| Total | 370.0 |

Uniformly blend the active ingredient, Carbowax 6000, lactose, and one half the weight of magnesium stearate required. This blend is then "slugged" on a suitable tablet press. These "slugs" are granulated through a number ten mesh screen on an oscillating granulator. These granules are then blended with the remainder of the magnesium stearate and the lubricated granules are then converted into tablets on a suitable tablet press.

Various modifications and equivalents will be apparent to one skilled in the art and may be made in the compounds, compositions, methods, and procedures of the present invention without departing from the spirit or scope thereof, and it is therefore to be understood that the invention is to be limited only by the scope of the appended claims.

What is claimed is:
1. A compound selected from
 (a) 2-(1-lower-alkyl-3-pyrrolidinyl) - 1,3 - propanediol dicarbamates having the formula:

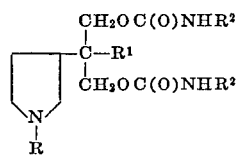

wherein;
  R is lower-alkyl,
  R¹ is selected from the group consisting of hydrogen, lower-alkyl and phenyl,
  R² is selected from the group consisting of lower-alkyl, phenyl, 4-methoxyphenyl, 4-chlorophenyl and 3,4,5-trimethoxyphenyl, and
 (b) acid-addition salts thereof.

2. A compound according to claim 1 which is 2-(1-ethyl-3-pyrrolidinyl)-1,3-propanediol bis(N-methylcarbamate).

3. A compound according to claim 1 which is 2-(1-ethyl-3-pyrrolidinyl)-1,3-propanediol bis(N - phenylcarbamate).

4. A compound according to claim 1 which is 2-(1-ethyl-3-pyrrolidinyl)-1,3-propanediol bis[N-(4 - methoxyphenyl)-carbamate].

5. A compound according to claim 1 which is 2-(1-ethyl-3-pyrrolidinyl) - 1,3 - propanediol bis[N - (4-chlorophenyl)-carbamate].

6. A compound according to claim 1 which is 2-(1-ethyl-3-pyrrolidinyl) - 2 - ethyl - 1,3 - propanediol bis(N-methylcarbamate).

7. A compound according to claim 1 which is 2-(1-ethyl - 3 - pyrrolidinyl) - 2 - ethyl-1,3-propanediol bis(N-phenylcarbamate).

8. A compound according to claim 1 which is 2-(1-ethyl - 3 - pyrrolidinyl) - 2 - ethyl-1,3-propanediol bis[N-(4-methoxyphenyl)-carbamate].

9. A compound according to claim 1 which is 2-(1-ethyl - 3 - pyrrolidinyl) - 2 - ethyl-1,3-propanediol bis[N-(3,4,5-trimethoxyphenyl)-carbamate].

References Cited

Noller: Chemistry of Organic Compounds (1965), pp. 197, 878.

Wagner et al.: Synthetic Organic Chemistry (1953), p. 645.

ALEX MAZEL, Primary Examiner

J. A. NARCAVAGE, Assistant Examiner

U.S. Cl. X.R.

260—326.5; 424—274